(12) United States Patent
Siomina

(10) Patent No.: US 10,051,504 B2
(45) Date of Patent: Aug. 14, 2018

(54) METHODS AND APPARATUSES FOR SUPPORTING MDT DURING EDRX

(71) Applicant: TELEFONAKTIEBOLAGET LM ERICSSON (PUBL), Stockholm (SE)

(72) Inventor: Iana Siomina, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/514,765

(22) PCT Filed: Dec. 2, 2016

(86) PCT No.: PCT/IB2016/057327
§ 371 (c)(1),
(2) Date: Mar. 27, 2017

(87) PCT Pub. No.: WO2017/134499
PCT Pub. Date: Aug. 10, 2017

(65) Prior Publication Data
US 2018/0091993 A1    Mar. 29, 2018

Related U.S. Application Data

(60) Provisional application No. 62/289,792, filed on Feb. 1, 2016.

(51) Int. Cl.
*H04W 24/10* (2009.01)
*H04W 52/02* (2009.01)
(Continued)

(52) U.S. Cl.
CPC .......... *H04W 24/10* (2013.01); *H04W 24/08* (2013.01); *H04W 52/0216* (2013.01);
(Continued)

(58) Field of Classification Search
None
See application file for complete search history.

(56) References Cited

U.S. PATENT DOCUMENTS

2012/0044822 A1\* 2/2012 Kim ...................... H04W 24/10
370/252
2017/0273022 A1\* 9/2017 Kazmi .............. H04W 52/0216
(Continued)

FOREIGN PATENT DOCUMENTS

EP         2713646 A2    4/2014
WO    2014/181981 A1    11/2014

OTHER PUBLICATIONS

Ericsson, "On DRX measurement requirements in RRC_IDLE state", 3GPP TSG RAN WG4 Meeting #76bis, Sophia Antipolis, France, Oct. 12-16, 2015, R4-156470 (Year: 2015).\*

(Continued)

*Primary Examiner* — Joseph A Bednash

(57) ABSTRACT

A wireless device obtains an extended discontinuous reception (eDRX) configuration for the wireless device, obtains a minimization of drive tests (MDT) configuration for the wireless device, and adapts at least one of the eDRX configuration and the MDT configuration such that the wireless device completes an MDT measurement according to the MDT configuration within a predetermined number of paging transmission windows (PTWs) associated with the eDRX configuration. The wireless device performs the MDT measurement within the predetermined number of PTWs according to the adapted at least one of the eDRX configuration and the MDT configuration.

48 Claims, 13 Drawing Sheets

(51) Int. Cl.
*H04W 74/08* (2009.01)
*H04W 24/08* (2009.01)
*H04W 76/28* (2018.01)
*H04W 76/04* (2009.01)

(52) U.S. Cl.
CPC ... *H04W 52/0229* (2013.01); *H04W 74/0833* (2013.01); *H04W 76/048* (2013.01); *H04W 76/28* (2018.02)

(56) References Cited

U.S. PATENT DOCUMENTS

2017/0273135 A1\* 9/2017 Siomina .............. H04W 76/048
2017/0273136 A1\* 9/2017 Siomina .............. H04W 76/048

OTHER PUBLICATIONS

Ericsson: "On eDRX measurement requirements in RRC IDLE state;" 3GPP draft; R4-156470; Oct. 12, 2015.
Nokia Siemens Network, et al., "Evaluation on SA2 identified solutions for UEPCOP;" 3GPP draft; R2-131147; Apr. 5, 2013.

\* cited by examiner

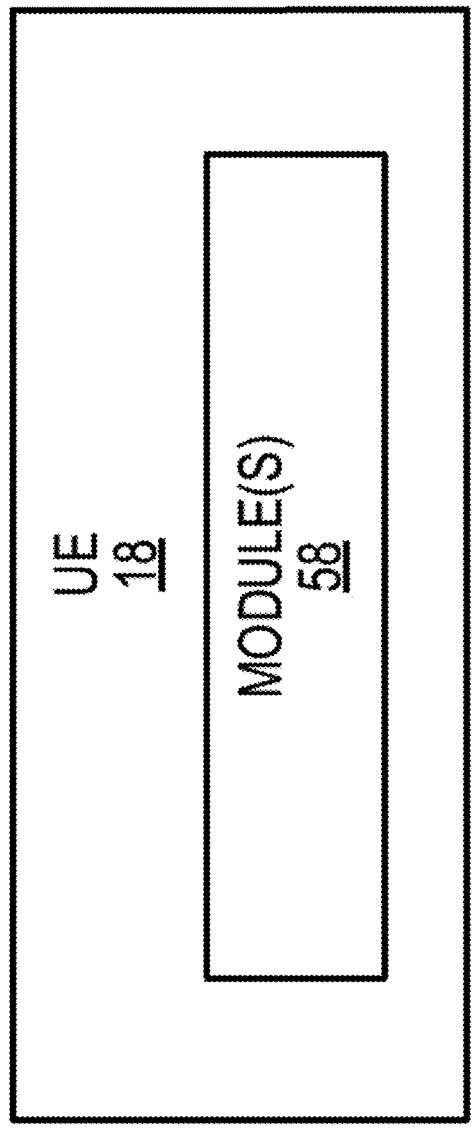

METHODS AND APPARATUSES FOR SUPPORTING MDT DURING EDRX

CROSS-REFERENCE TO RELATED APPLICATIONS

This application is a National Stage Entry of PCT/IB2016/057327, filed Dec. 2, 2016, which claims the benefit of U.S. Provisional Application No. 62/289,792, filed Feb. 1, 2016, the disclosures of which are fully incorporated herein by reference.

TECHNICAL FIELD

The disclosed subject matter relates generally to telecommunications. Certain embodiments relate more particularly to Minimization of Drive Tests (MDT) and enhanced or evolved Discontinuous Reception (eDRX).

BACKGROUND

Minimization of Drive Tests (MDT)

Minimization of Drive Tests (MDT) is a feature in Third Generation Partnership Project (3GPP) Long Term Evolution (LTE) and Universal Terrestrial Radio Access (UTRA). According to MDT, a User Equipment device (UE) is configured to log one or more radio measurement results along with associated information, which may comprise location where the measurement is performed, timing information such as timestamp when measurement is performed, etc. The UE can be configured to log such measurements in low activity state (e.g. idle state) and/or in Radio Resource Control (RRC) connected state. The UE may report the logged information to the network node when the UE goes into the RRC connected state. The network node uses the MDT related information received from the plurality of UEs for network deployment related functions e.g. determination of coverage holes, network planning, configuration of system parameters, etc. The MDT therefore avoids the need for doing drive tests for network planning and optimization.

Figure (FIG. 1 shows an example MDT architecture.

The network node (e.g. enhanced or evolved Node B [eNB]) can also configure the UE to log measurements performed on Multimedia Broadcast Multicast Service (MBMS)-related signals: Multicast Broadcast Single Frequency Network (MBSFN) Reference Signal Received Power (RSRP) (on MBSFN reference signals), MBSFN Reference Signal Received Quality (RSRQ) (on MBSFN reference signals), and Multicast Channel (MCH) Block Error Rate (BLER) (on MCH)—all these measurements can only be configured and performed in MBSFN subframes with MCH transmitted. The measurements can be configured per MBSFN area (up to 8 MBSFN areas) and per MCH (up to 15 MCHs within an MBSFN area).

The requested measurements may be further limited to one or more Public Land Mobile Networks (PLMNs) and/or one or more cells and/or one or more tracking areas and/or specific carrier frequency. The measurements in the measurement logs are also linked to a time stamp and (optionally) positioning information that are available in the UE. The time stamp can be expressed in absolute or relative values. The relative time stamp is defined as the time elapsed from a reference time to the moment the measurement is logged by a radio node. The relative accuracy of the time stamping (aka relative time stamp accuracy) is the drift of the time stamping e.g. ±1 second. It may also be expressed in terms of parts per million (ppm) or parts per billion (ppb) over certain time duration e.g. ±200 ppb over 1 hour. This in turn corresponds to ±0.72 second of drift in time stamp over a period of 1 hour.

Among others, some of the logging configuration parameters include the following, e.g., those received in LoggedMeasurementConfiguration:

Trace reference, trace session and Trace Collection Entity (tce) information
Logging interval
Logging duration
Time information (absolute time in the current cell)
PLMN list
Area list
Target MBSFN area list.

Discontinuous Reception (DRX)

Power consumption is important for UEs using battery or an external power supply and its importance increases with the continued growth of device populations and more demanding use cases. The importance can be illustrated by the following scenarios, e.g.:

For Machine-to-Machine (M2M) use cases like sensors that run on battery it is a major cost to on site exchange (or charge) the batteries for a large amount of devices and the battery lifetime may even determine the device's lifetime if it is not foreseen to charge or replace the battery;

Even for scenarios where UEs may consume power from an external power supply, it may be desirable to consume less power for energy efficiency purposes.

Enhancing DRX operation is a way to improve battery saving in the UE. DRX makes the UE reachable during pre-defined occasions without resulting in unnecessary signaling. As currently defined, DRX cycles in LTE can at most be 2.56 seconds and thus would not allow for sufficient power savings for UEs that only need to wake-up infrequently (e.g. every few or tens of minutes) for data. Hence, DRX cycle extension is required in order to enable significant battery savings for such UEs. Furthermore, the DRX cycle can be set depending on the data delay tolerance and power saving requirements, thus providing a flexible solution for achieving significant UE battery savings.

Currently, 3GPP is defining enhanced or evolved DRX (eDRX) operation for UEs in CONNECTED mode in LTE and for UEs in IDLE mode in LTE and UTRA. In LTE, the eDRX in IDLE is based on the Hyper System Frame Number (H-SFN) concept.

DRX Configuration for Non-eDRX (Legacy) UE

In LTE, DRX has been introduced as a prominent solution to conserve battery power in mobile terminal. DRX is characterized by the following:

Per UE mechanism (as opposed to per radio bearer);
May be used in RRC_IDLE and RRC_CONNECTED; In RRC_CONNECTED, eNB/UE may initiate the DRX mode when there are no outstanding/new packets to be transmitted/received; in RRC_IDLE
Second Generation (2G) and Third Generation (3G) terminal use discontinuous reception in idle state to increase battery life time. High Speed Packet Access (HSPA) and LTE have introduced DRX also for connected state Available DRX values are controlled by the network and start from non-DRX up to x seconds.

Hybrid Automatic Repeat Request (HARQ) operation related to data transmission is independent of DRX operation and the UE wakes up to read the Physical Downlink Control Channel (PDCCH) for possible retransmissions and/or ACK/NAK signaling regardless of DRX. In the downlink, a timer is used to limit the time the UE stays awake awaiting for a retransmission;

When DRX is configured, the UE may be further configured with an "on-duration" timer during which time the UE monitors the PDCCHs for possible allocations;

When DRX is configured, periodic Channel Quality Indication (CQI) reports can only be sent by the UE during the "active-time." RRC can further restrict periodic CQI reports so that they are only sent during the on-duration;

eNB does not transmit packets to UE during the sleep mode.

For UE in RRC_IDLE

A UE is set to DRX in idle mode after a prolonged time of air interface inactivity. It's also known as paging DRX, i.e. the time the mobile device can go to sleep between two paging messages which could contain a command for the mobile to wake up again and change back to RRC_CONNECTED state.

FIG. 2 illustrates a procedure for determining an IDLE_DRX cycle in a legacy system.

Referring to FIG. 2, the eNB broadcasts a default DRX value via System Information Block 1 (SIB1). UE can provide a UE specific DRX value to Mobility Management Entity (MME) if UE wants to have a shorter DRX than the default value. Upon triggering a paging for the UE, MME sends the UE specific DRX value together with the paging. Both UE and eNB know the default DRX value and the UE specific DRX value, and the final DRX cycle T is set to the shortest of them. If UE does not provide the UE specific DRX value, the final DRX cycle T is the default DRX value.

One Paging Frame (PF) is one Radio Frame, which may contain one or multiple Paging Occasion(s). When DRX is used, the UE needs only to monitor one Paging Occasion (PO) per DRX cycle.

For UE in RRC_CONNECTED

The following definitions apply to DRX in evolved or enhanced Universal Terrestrial Radio Access Network (E-UTRAN):

on-duration: duration in downlink subframes that the UE waits for, after waking up from DRX, to receive PDCCHs. If the UE successfully decodes a PDCCH, the UE stays awake and starts the inactivity timer;

inactivity-timer: duration in downlink subframes that the UE waits to successfully decode a PDCCH, from the last successful decoding of a PDCCH, failing which it re-enters DRX. The UE shall restart the inactivity timer following a single successful decoding of a PDCCH for a first transmission only (i.e. not for retransmissions).

active-time: total duration that the UE is awake. This includes the "on-duration" of the DRX cycle, the time UE is performing continuous reception while the inactivity timer has not expired and the time UE is performing continuous reception while waiting for a downlink retransmission after one HARQ Round Trip Time (RTT). Based on the above the minimum active time is of length equal to on-duration, and the maximum is undefined (infinite).

Of the above parameters the on-duration and inactivity-timer are of fixed lengths, while the active-time is of varying lengths based on scheduling decision and UE decoding success. Only on-duration and inactivity-timer duration are signaled to the UE by the eNB:

There is only one DRX configuration applied in the UE at any time;

UE shall apply an on-duration on wake-up from DRX sleep.

FIG. 3 illustrates an example of DRX mode in LTE. DRX is triggered by means of an inactivity time known as DRX. As illustrated by FIG. 3, the UE activity time may be extended if PDCCH is received during ON Duration time. However, it may also be shortened by a Medium Access Control (MAC) DRX command, upon reception of which the UE stops onDurationTimer and drx-InactivityTimer.

If PDCCH has not been successfully decoded during the on-duration, the UE shall follow the DRX configuration (i.e. the UE can enter DRX sleep if allowed by the DRX configuration):

This applies also for the sub-frames where the UE has been allocated predefined resources.

If it successfully decodes a PDCCH for a first transmission, the UE shall stay awake and start the inactivity timer (even if a PDCCH is successfully decoded in the sub-frames where the UE has also been allocated predefined resources) until a MAC control message tells the UE to re-enter DRX, or until the inactivity timer expires. In both cases, the DRX cycle that the UE follows after re-entering DRX is given by the following rules:

If a short DRX cycle is configured, the UE first follows the short DRX cycle and after a longer period of inactivity the UE follows the long DRX cycle; if short DRX cycle is used, the long cycle will be a multiple of the short cycle;

Durations for long and short DRX are configured by the RRC. The transition between the short and long DRX cycles is determined by the eNB MAC commands (if the command is received and short DRX is configured, the UE will (re)start drxShortCycleTimer and use the Short DRX Cycle; otherwise long DRX will be used) or by the UE based on an activity timer Else the UE follows the long DRX cycle directly.

eDRX configuration in LTE

For UE in RRC_IDLE

Similar to DRX, eDRX configuration parameters are "negotiated" between UE and the network via Non-Access Stratum (NAS). The UE may include eDRX parameters in ATTACH REQUEST or TRACKING AREA UPDATE REQUEST messages. The network shall include eDRX parameters (eDRX cycle; inclusion of paging window length is "For Future Study" [FFS]) in ATTACH ACCEPT or TRACKING AREA UPDATE ACCEPT messages if the UE included eDRX parameters (eDRX cycle) in the corresponding REQUEST message and the network supports and accepts the use of eDRX. The eDRX parameters: eDRX cycle length and Paging Time Window (PTW) length.

UE is configured with a PTW assigned by MME and provided to UE via NAS (3GPP TS 24.301). PTW is characterized by:

Paging H-SFN (PH) (calculated by a formula):
H-SFN mod TeDRX=(UE_ID mod TeDRX)
UE_ID: IMSI mod 1024
TeDRX: eDRX cycle of the UE, (TeDRX=1, 2, . . . , 256 in hyper-frames) and configured by upper layers PTW start (calculated within PH):
The start of PTW is uniformly distributed across 4 paging starting points within the PH.
PW_start denotes the first radio frame of the PH that is part the paging window and has System Frame Number (SFN) satisfying the following equation:

SFN=256*ieDRX, where ieDRX=floor(UE_ID/TeDRX,H) mod 4

PW_end is the last radio frame of the PW and has SFN satisfying the following equation:

SFN=(PW_start+$L$*100−1) mod 1024, where $L$=Paging Window length (in seconds) configured by upper layers PTW length (configured by higher layers).

Within a PTW, the UE is further configured with a legacy DRX (FIG. 4).

H-SFN is defined as a new frame structure on top of the legacy SFN structure, where each H-SFN value corresponds to a cycle of 1024 legacy frames and one H-SFN cycle contains 1024 hyper-SFNs (10 bits)—see FIG. 3. All MMEs and eNBs have the same H-SFN, and cells broadcast their H-SFN via SIB1 or SIB1bis.

The PTW is assigned by MME and provided to UE via NAS during attach/tracking area update. The beginning of PTW is calculated by a pre-defined formula.

For UE in RRC_CONNECTED eDRX procedure for RRC_CONNECTED UE is the same as the legacy case, except that two new DRX cycles have been added: 5.12, 10.28 seconds.

eDRX Capabilities

For LTE, the following eDRX-related capabilities have been agreed in 3GPP:

Cell eDRX capability to support eDRX in RRC_IDLE (eDRXAllowed)

UE eDRX capability to support eDRX in RRC_CONNECTED

Cell eDRX Capability (IDLE)

The cell eDRX capability is broadcasted via SIB1, which is specified in 36.331, v13.0.0:

```
SystemInformationBlockType1-v13xy-IEs ::= SEQUENCE {
    hyperSFN            BIT STRING (SIZE 10))   OPTIONAL,
    eDRXAllowed         ENUMERATED {true}       OPTIONAL,
    nonCriticalExtension SEQUENCE { }           OPTIONAL
}
hyperSFN
Indicates hyper SFN which increments by one when the SFN wraps around.
eDRXAllowed
Indicates if idle mode extended DRX is allowed in the cell. The UE shall not operate in
idle mode extended DRX unless eDRXAllowed is set to TRUE.
```

UE eDRX Capability (CONNECTED)

The UE can indicate to e Node B its capability to support eDRX in RRC_CONNECTED via UE-EUTRA-Capability information element in RRC.

```
UE-EUTRA-Capability-v13xy-IEs ::= SEQUENCE {
    mac-Parameters-r13      MAC-Parameters-r13
    OPTIONAL,
    nonCriticalExtension    SEQUENCE { }
    OPTIONAL
}
MAC-Parameters-r13 ::=      SEQUENCE {
    extendedLongDRX-r13     ENUMERATED {supported}
    OPTIONAL
}
extendedLongDRX
Indicates whether the UE supports extended long DRX cycles of 5.12s and 10.24s in
connected mode.
``` eDRX Configuration in UTRA

FIG. 6 illustrates eDRX in UTRA. In UTRA, eDRX have been specified only for IDLE state. In eDRX for UTRA, the DRX cycle is prolonged to some seconds which is much longer than the legacy DRX cycles. The DRX cycle consists of a long sleep period, then the UE wakes up to a Paging Transmission Window where there are N_PTW paging occasions with the legacy PS DRX cycle.

SUMMARY

In some embodiments of the disclosed subject matter, a method in a wireless device comprises obtaining an extended discontinuous reception (eDRX) configuration for the wireless device, obtaining a minimization of drive tests (MDT) configuration for the wireless device, adapting at least one of the eDRX configuration and the MDT configuration such that the wireless device completes an MDT measurement according to the MDT configuration within a predetermined number of paging transmission windows (PTWs) associated with the eDRX configuration, and performing the MDT measurement within the predetermined number of PTWs according to the adapted at least one of the eDRX configuration and the MDT configuration.

In certain related embodiments, the predetermined number of PTWs is one.

In certain related embodiments, the method further comprises determining the number of PTWs, at least based on a measurement type of the MDT measurement and the eDRX configuration.

In certain related embodiments, the MDT measurement is an E-UTRA reference signal received power (RSRP) measurement or an E-UTRA reference signal received quality (RSRQ) measurement.

In certain related embodiments, the MDT measurement is a Multicast-broadcast single-frequency network (MBSFN) measurement.

In certain related embodiments, the method further comprises logging the measurement within the predetermined number of PTWs.

In certain related embodiments, adapting the at least one of the eDRX configuration and the MDT configuration comprises changing a size of the PTW.

In certain related embodiments, adapting the at least one of the eDRX configuration and the MDT configuration comprises changing a DRX cycle length.

In certain related embodiments, the method further comprises logging the MDT measurement within the predetermined number of PTWs according to the adapted at least one of the eDRX configuration and the MDT configuration.

In certain related embodiments, the method further comprises indicating to another node the wireless device's capability to jointly support eDRX and MDT.

In some embodiments of the disclosed subject matter, a method in a network node comprises adapting at least one of an extended discontinuous reception (eDRX) configuration and a minimization of drive tests (MDT) configuration for a wireless device such that the wireless device can complete an MDT measurement according to the MDT configuration within a predetermined number of paging transmission windows (PTWs) associated with the eDRX configuration, and transmitting, to another node, the adapted at least one of the MDT configuration and the eDRX configuration.

In certain related embodiments, the predetermined number of PTWs is one.

In certain related embodiments, the method further comprises determining the number of PTWs, at least based on a measurement type of the MDT measurement and the eDRX configuration.

In certain related embodiments, the MDT measurement is E-UTRA reference signal received power (RSRP) or E-UTRA reference signal received quality (RSRQ) measurement.

In certain related embodiments, the MDT measurement is a Multicast-broadcast single-frequency network (MBSFN) measurement.

In certain related embodiments, the method further comprises logging the measurement within the predetermined number of PTWs.

In certain related embodiments, adapting the at least one of the eDRX configuration and the MDT configuration comprises changing a size of the PTW.

In certain related embodiments, adapting the at least one of the eDRX configuration and the MDT configuration comprises changing a DRX cycle length.

In certain related embodiments, the method further comprises obtaining an indication of the wireless device's capability to jointly support eDRX and MDT (200).

In certain related embodiments, the method further comprises indicating to another node the network node's capability to jointly support eDRX and MDT.

In some embodiments of the disclosed subject matter, a wireless device comprises at least one processor and memory collectively configured to obtain an extended discontinuous reception (eDRX) configuration for the wireless device, obtain a minimization of drive tests (MDT) configuration for the wireless device, adapt at least one of the eDRX configuration and the MDT configuration such that the wireless device completes an MDT measurement according to the MDT configuration within a predetermined number of paging transmission windows (PTWs) associated with the eDRX configuration, and perform the MDT measurement within the predetermined number of PTWs according to the adapted at least one of the eDRX configuration and the MDT configuration. Such a wireless device may be further configured to perform various operations as described above in relation to the method in the wireless device.

In some embodiments of the disclosed subject matter, a network node comprises at least one processor and memory collectively configured to adapt at least one of an extended discontinuous reception (eDRX) configuration and a minimization of drive tests (MDT) configuration for a wireless device such that the wireless device can complete an MDT measurement according to the MDT configuration within a predetermined number of paging transmission windows (PTWs) associated with the eDRX configuration, and a transmitter configured to transmit, to another node, the adapted at least one of the MDT configuration and the eDRX configuration. Such a network node may be further configured to perform various operations as described above in relation to the method in the network node.

In some embodiments of the disclosed subject matter, a wireless device comprises a first obtaining module configured to obtain an extended discontinuous reception (eDRX) configuration for the wireless device, a second obtaining module configured to obtain a minimization of drive tests (MDT) configuration for the wireless device, an adapting module configured to adapt at least one of the eDRX configuration and the MDT configuration such that the wireless device completes an MDT measurement according to the MDT configuration within a predetermined number of paging transmission windows (PTWs) associated with the eDRX configuration, and a measurement module configured to perform the MDT measurement within the predetermined number of PTWs according to the adapted at least one of the eDRX configuration and the MDT configuration. Such a wireless device may further comprise additional modules configured to perform various operations as described above in relation to the method in the wireless device.

In some embodiments of the disclosed subject matter, a network node comprises an adapting module configured to adapt at least one of an extended discontinuous reception (eDRX) configuration and a minimization of drive tests (MDT) configuration for a wireless device such that the wireless device can complete an MDT measurement according to the MDT configuration within a predetermined number of paging transmission windows (PTWs) associated with the eDRX configuration, and a transmission module configured to transmit, to another node, the adapted at least one of the MDT configuration and the eDRX configuration. Such a network node may further comprise additional modules configured to perform various operations as described above in relation to the method in the network node.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 13 is a block diagram of a wireless device according to an embodiment of the disclosed subject matter.

DETAILED DESCRIPTION

Figure 1:
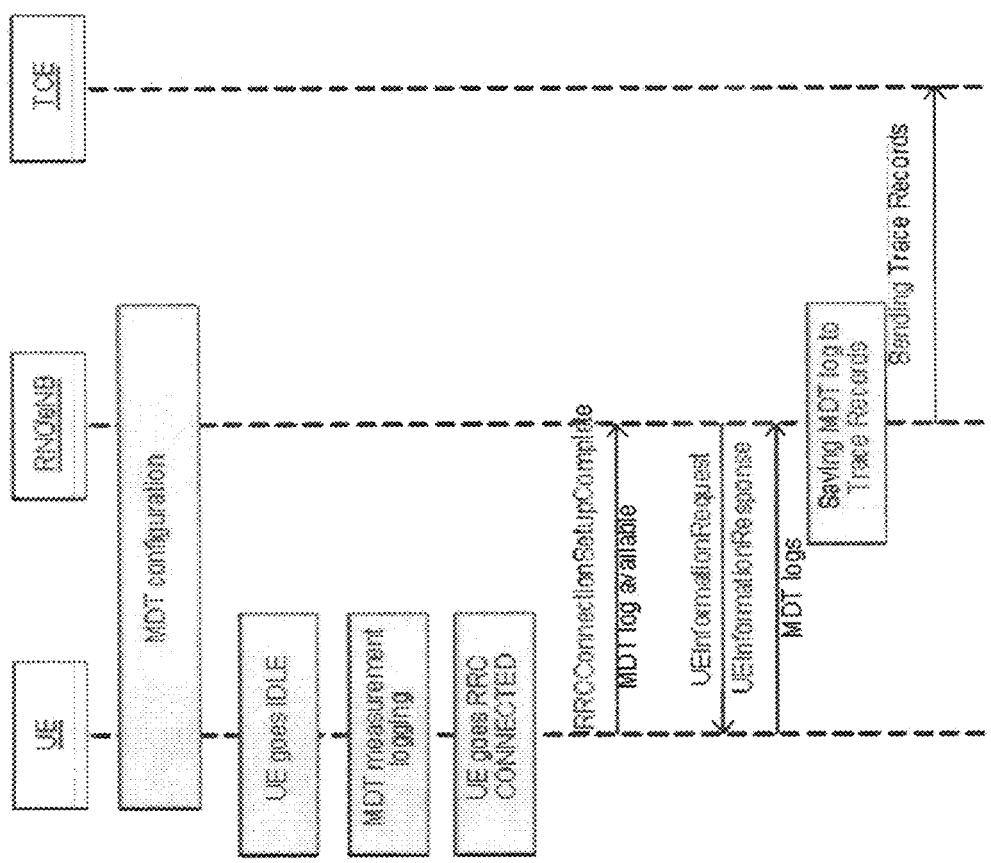
FIG. 1 illustrates an example Minimizing Drive Tests (MDT) architecture.
Figure 2:
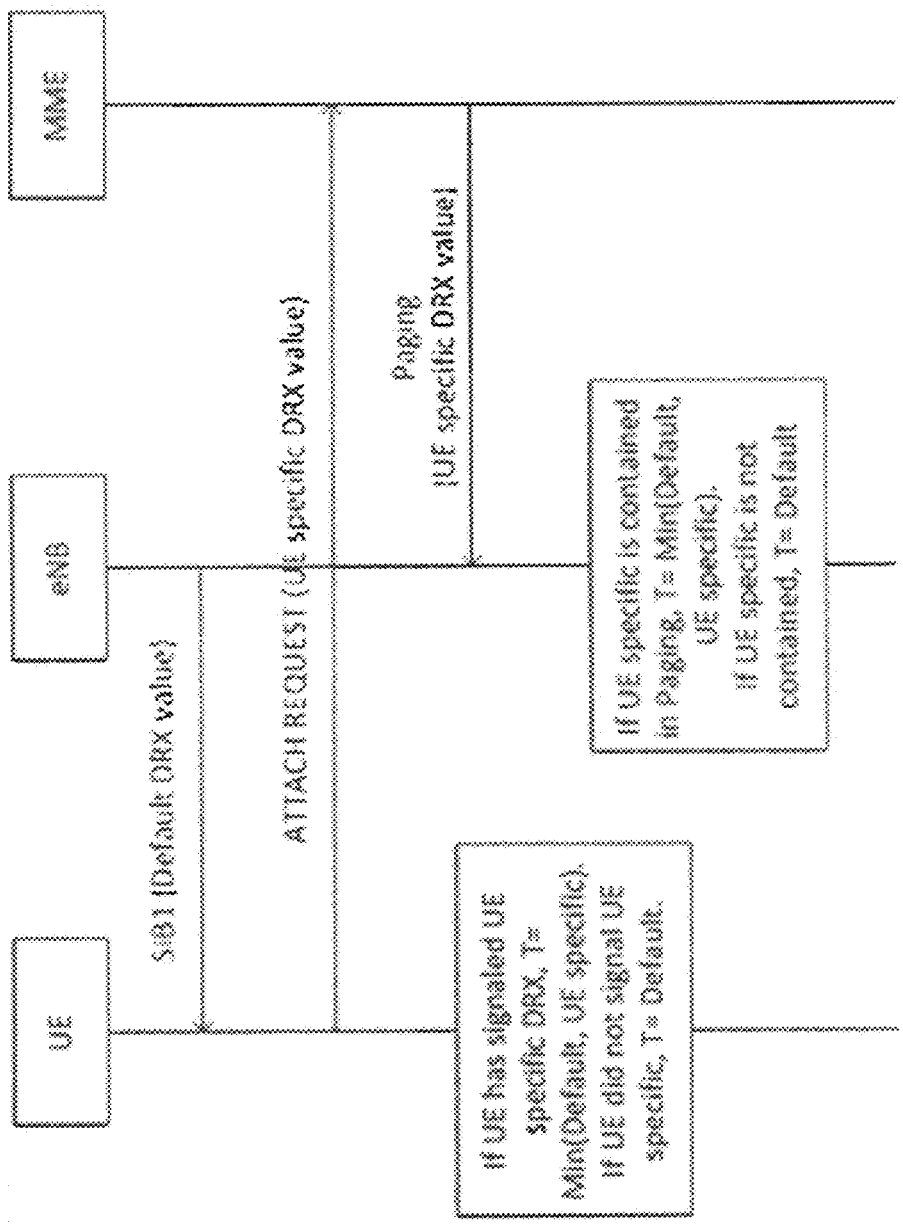
FIG. 2 is a legacy procedure to determine the IDLE Discontinuous Reception (DRX) cycle.
Figure 3:
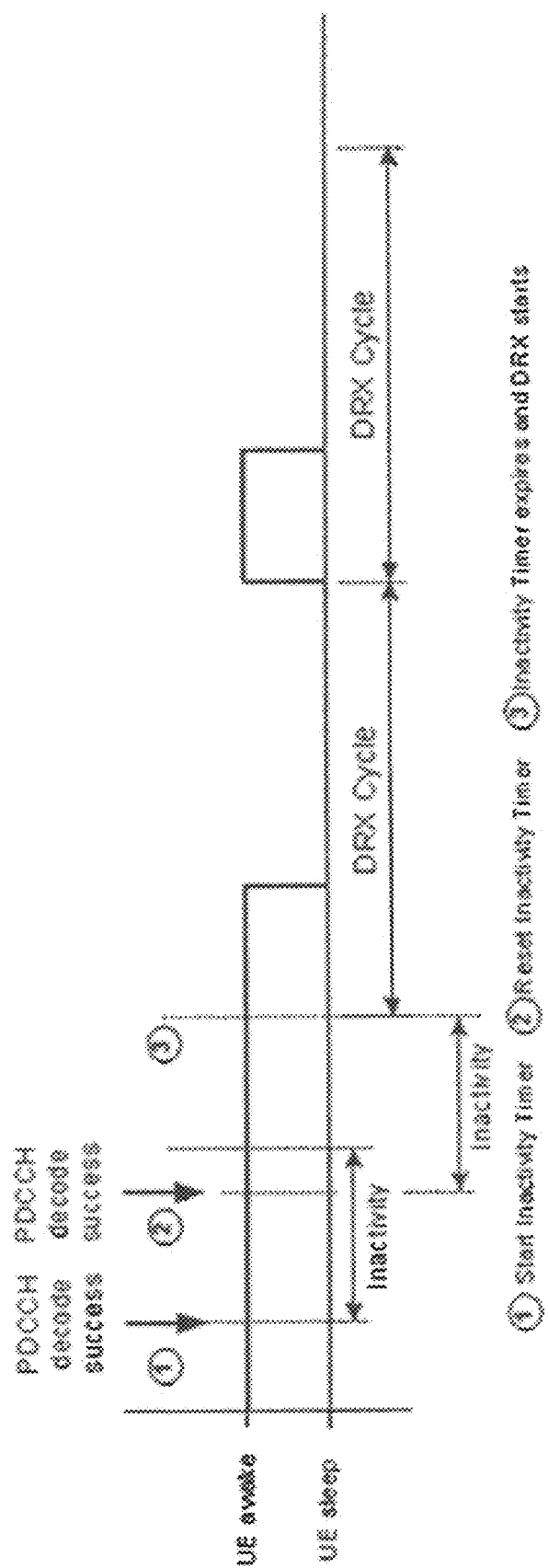
FIG. 3 illustrates DRX mode in Long Term Evolution (LTE).
Figure 4:
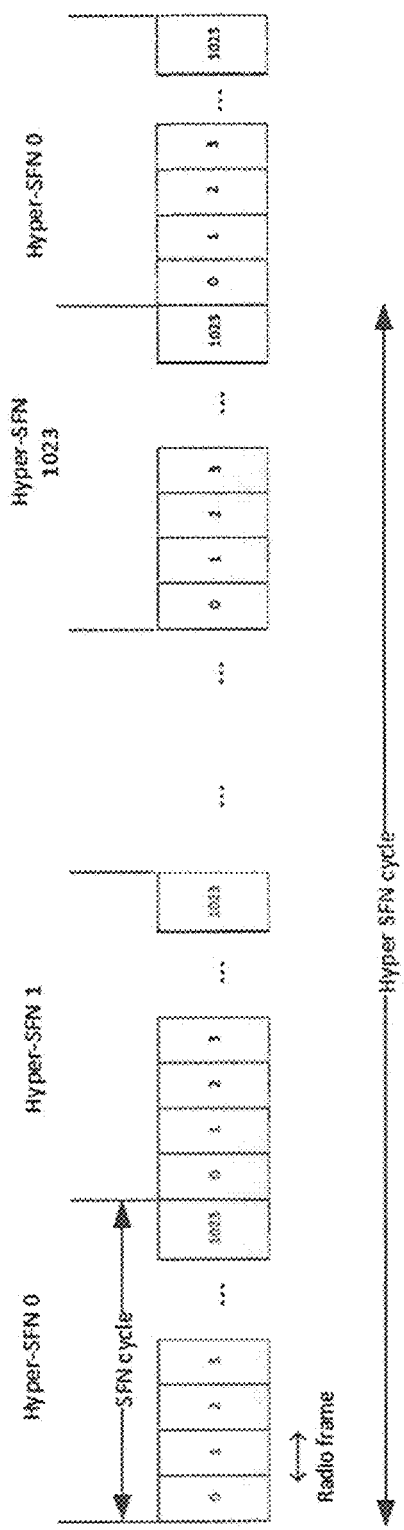
FIG. 4 illustrates a Hyper System Frame Number (H-SFN) cycle.
Figure 5:
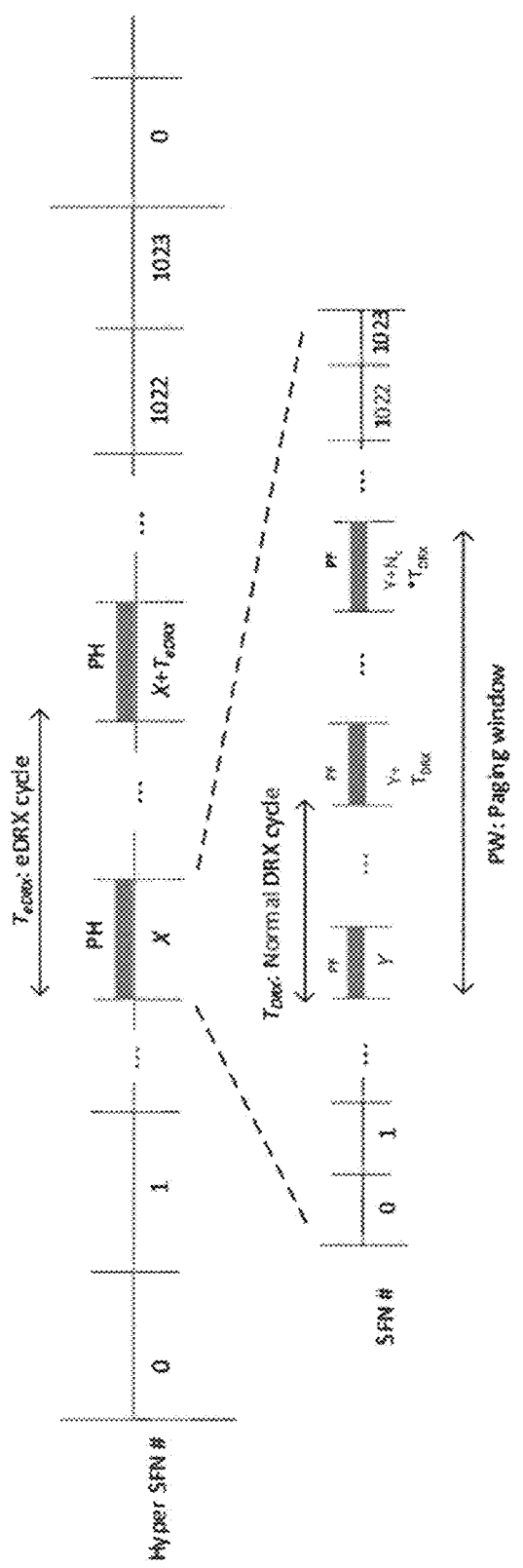
FIG. 5 illustrates the relation between H-SFN, paging window, and enhanced or evolved DRX (eDRX) periodicity.
Figure 6:
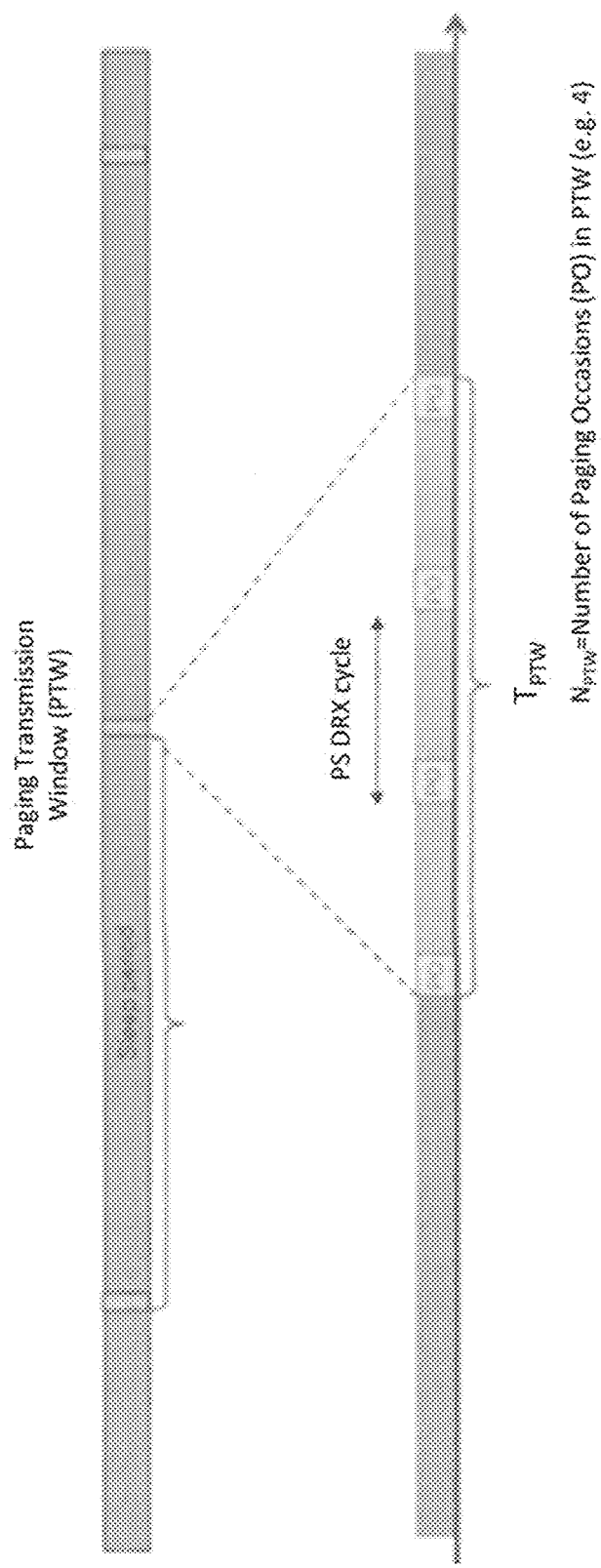
FIG. 6 illustrates eDRX in Universal Terrestrial Radio Access (UTRA).

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Any two or more embodiments described in this document may be combined in any way with each other. Furthermore, even though the examples herein are given in the LTE context, the embodiments described herein are not limited to LTE and can also apply in a more general case when the User Equipment device (UE) may need to configure measurement period adaptively to one or more conditions, e.g., channel quality, Ês/Iot, Signal to Interference plus Noise Ratio (SINR), received signal quality, total interference or interference on a specific resources or from a specific interferer(s), etc. Other non-limiting examples where the described herein methods are particularly beneficial include measurement s for Discontinuous Reception (DRX) or enhanced or evolved DRX (eDRX), and measurements in high speed train environments.

In some embodiments the non-limiting term "UE" is used. The UE herein can be any type of wireless device capable of communicating with network node or another UE using radio signals. The UE may also be a radio communication device, target device, Device-to-Device (D2D) UE, machine type UE or UE capable of Machine-to-Machine (M2M) communication, a sensor equipped with UE, iPAD, tablet, mobile terminals, smart phone, Laptop Embedded Equipment (LEE), Laptop Mounted Equipment (LME), Universal Serial Bus (USB) dongles, Customer Premises Equipment (CPE), etc.

Also in some embodiments the term "network node," is used. It can be any kind of network node which may comprise e.g. a radio network node such as base station, radio base station, base transceiver station, base station controller, network controller, enhanced or evolved Node B (eNB), Node B, multi-Radio Access Technology (RAT) base station, Multi-cell/Multicast Coordination Entity (MCE), relay node, access point, radio access point, Remote Radio Unit (RRU) Remote Radio Head (RRH), a core network node (e.g., Mobility Management Entity (MME), Self-Optimizing Network (SON) node, a coordinating node, etc.), or even an external node (e.g., third party node, a node external to the current network), etc.

The term "radio node" used herein may be used to denote a UE or a radio network node.

Terms such as "adapting a configuration" or "adapting a configuration parameter" may refer to e.g. changing one or more values of one or more parameters associated with a configuration, such as an eDRX configuration or an MDT configuration.

The described embodiments are applicable to single carrier as well as multicarrier or Carrier Aggregation (CA) operation of the UE in which the UE is able to receive and/or transmit data to more than one serving cells. The term CA is also called (e.g. interchangeably called) "multi-carrier system," "multi-cell operation", "multi-carrier operation," "multi-carrier" transmission and/or reception. In CA one of the Component Carriers (CCs) is the Primary Component Carrier (PCC) or simply primary carrier or even anchor carrier. The remaining ones are called Secondary Component Carrier (SCC) or simply secondary carriers or even supplementary carriers. The serving cell is interchangeably called a Primary Cell (PCell) or Primary Serving Cell (PSC). Similarly, the SCC is interchangeably called a Secondary Cell (SCell) or Secondary Serving Cell (SSC).

The term "signaling" used herein may comprise any of: high-layer signaling (e.g., via Radio Resource Control (RRC)), lower-layer signaling (e.g., via a physical control channel or a broadcast channel), or a combination thereof. The signaling may be implicit or explicit. The signaling may further be unicast, multicast, or broadcast. The signaling may also be directly to another node or via a third node.

The term "measurement" herein refers to radio measurements. Some examples of radio measurements are: signal strength or signal power measurements (e.g., Reference Signal Received Power (RSRP) or RSR Using Channel State Information (CSI) Reference Symbols (CSI-RSRP)), signal quality measurements (e.g., Reference Signal Received Quality (RSRQ), SINR, RS-SINR), timing measurements (e.g., Rx-Tx, Reference Signal Time Difference (RSTD), Round Trip Time (RTT), Time of Arrival (TOA)), Radio Link Monitoring (RLM) measurements, cell detection, cell identification, cell (re)selection, CSI, Precoding Matrix Indicator (PMI), and Channel Quality Indication (CQI) measurements, system information reading, etc. The measurements may be absolute or relative (e.g., absolute RSRP and relative RSRP). The measurements may be performed for one or more different purposes, e.g. Radio Resource Management (RRM), SON, positioning, Minimizing Drive Tests (MDT), etc. The measurements may be, e.g., intra-frequency measurements, inter-frequency measurements, inter-RAT measurements, or CA measurements. The measurements may be performed in the licensed and/or unlicensed spectrum.

The term "eDRX" may refer to a long inactivity configuration (a.k.a., discontinuous activity with long inactivity periods, eDRX, extended DRX, long DRX, etc.) may be, e.g., the configuration characterized by one or more of: the inactivity period is above a threshold, ratio of inactivity period to activity period in the same cycle is larger than a certain threshold or ratio of activity period to inactivity period in the same cycle is below a certain threshold, difficulty or UE inability to combine or average samples from different activity cycles. This may be due to any one or more of: implementation constraints such as limited memory and/or processing resources, very different radio conditions during any two successive activity durations of the corresponding successive activity cycles, larger difference (e.g. more than 6 decibels (dB)) between the measurement samples obtained during any two successive activity durations of the corresponding successive activity cycles etc.; eDRX (see e.g. the background section); Relation between the number of downlink subframes per frame and the activity period and/or inactivity period of the UE activity configuration e.g. fewer downlink subframes such as 2 per frame and long inactivity cycles such as 10.24 seconds or longer; relation between the number of uplink subframes per frame and the activity period and/or inactivity period of the UE activity configuration. The UE may be using and/or be configured with eDRX, eDRX may be for UE in RRC_CONNECTED, RRC_IDLE, or another mode.

The term "MDT" used herein may refer to the so-named feature defined by Third Generation Partnership Project (3GPP) for Long Term Evolution (LTE) and Universal Terrestrial Radio Access (UTRA) or any of its enhancement or evolution, e.g., eMDT or MDT-like functionality for Fifth Generation (5G), NX, etc.

The embodiments described herein may apply to any RAT or their evolution, e.g., LTE Frequency Division Duplexing (FDD), LTE Time Division Duplexing (TDD), UTRA, Global System for Mobile Communications (GSM), WiFi, short-range communication RAT, narrow band RAT, RAT for 5G, NX, etc.

At least the following problems can be envisioned in conventional solutions/standards. First, MDT measurements may not be finished within a single Paging Time Window (PTW) and the eDRX cycle between two PTWs may be too long (up to >40 minutes) and exceed the current maximum MDT measurement time in the requirements. Second, the eDRX cycle between two PTWs may be too long and exceed the current MDT logging interval, so it is unclear what the UE should do because the measurement requirement would not be met when the logging interval timer expires. Third, the time stamp for MDT measurements over multiple PTWs may be too inaccurate.

Any of the above may result in any of (a) increased UE power consumption, (b) poor quality of UE MDT measurements, which are to be used by the network e.g. for RRM, SON, etc., which in turn may result in poor network configuration too, or (c) MDT failure with eDRX or eDRX failure with MDT.

Figure 7:
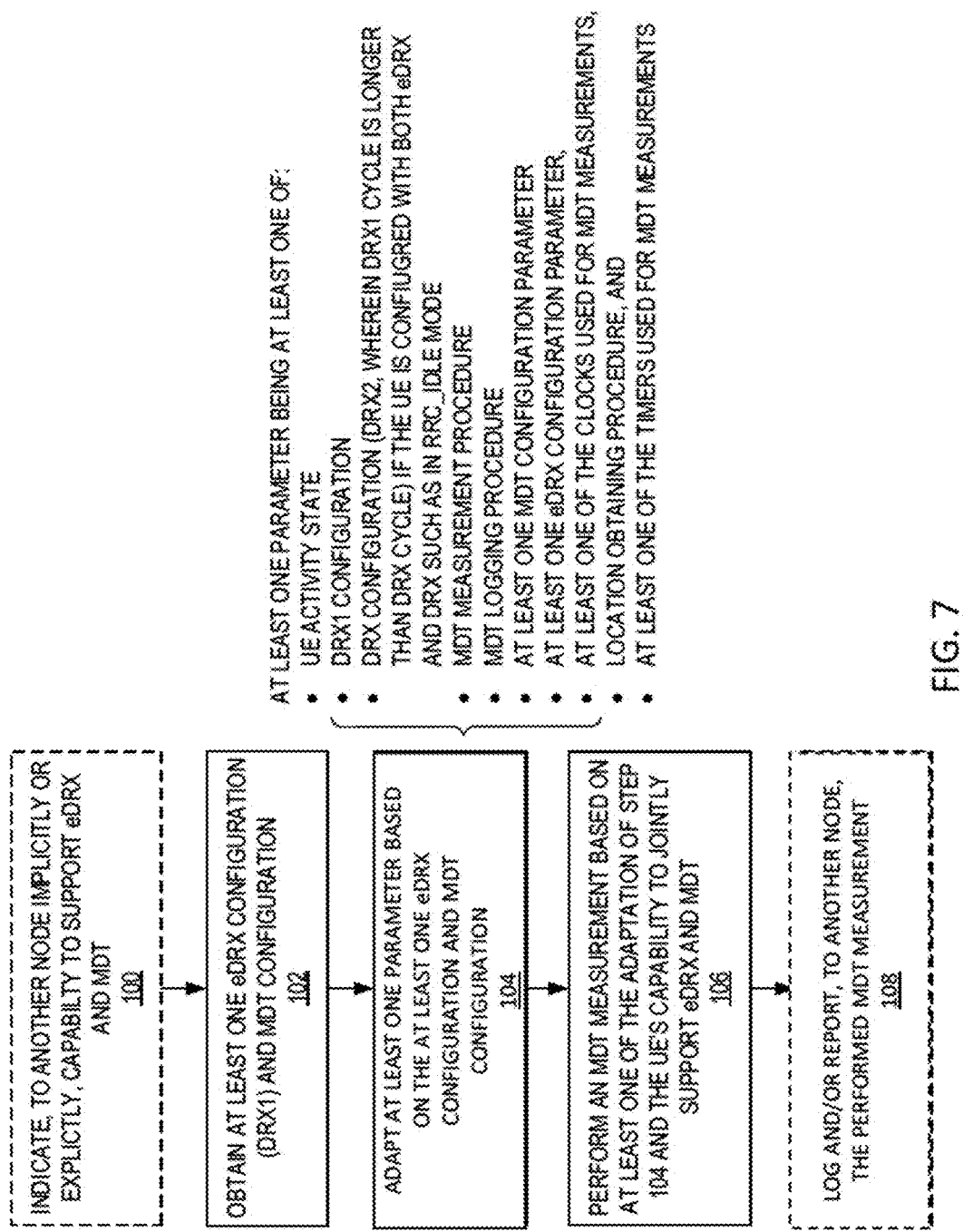
FIG. 7 is a flow chart illustrating the operation of a wireless device, or User Equipment device (UE), according to some embodiments of the disclosed subject matter.

FIG. 7 illustrates a method of operating a UE according to an example embodiment.

Referring to FIG. 7, the method comprises
Step 100 (optional): Indicate to another node (e.g., network node or another UE) implicitly or explicitly its capability to jointly support eDRX and MDT.
Step 102: Obtain at least one of eDRX configuration (say, DRX1) and MDT configuration.
Step 104: Based on the obtained configuration, adapt at least one of: UE activity state, DRX1 configuration, DRX configuration (say, DRX2, wherein a DRX1 cycle is longer than DRX2 cycle) if the UE is configured with both eDRX and DRX such as in RRC_IDLE mode, MDT measurement procedure, MDT logging procedure, at least one MDT configuration parameter, at least one eDRX configuration parameter, at least one of the clocks used for MDT measurements, location obtaining procedure, and at least one of the timers used for MDT measurements.
Step 106: Perform an MDT measurement, based on at least one of the adaption above and the UE's capability to jointly support eDRX and MDT.
Step 108 (optional): Log and/or report to another node (HE or network node) the performed MDT measurement.

UE's Capability to Jointly Support eDRX and MDT

It may be so that some, but not all, UEs are capable of jointly supporting eDRX and MDT. UEs with capability may be capable of at least performing MDT measurements in eDRX mode. Additionally, such capability may also comprise any one or more of:
Ability to receive related signaling (e.g. at least one MDT parameter applicable in UE eDRX mode and/or at least one eDRX parameter applicable for MDT) from another node (e.g., a network node or another UE),
Ability to send related message (e.g., report an MDT measurement in eDRX mode) or indication (e.g., indicate for at least one MDT measurement that it was performed in eDRX mode; or indicate that the UE is performing MDT measurements when configured with eDRX) to another node (e.g., a network node or another UE),
Ability to indicate to another node (e.g., a network node or another UE) that the UE is capable of jointly supporting eDRX and MDT,
Ability to log an MDT measurement while being in eDRX mode,
Ability to log an MDT measurement performed in eDRX mode,
Ability to indicate in a measurement log that the UE has been in eDRX while performing one or more MDT measurements or while being configured with MDT,
Ability to meet at least one requirement for an MDT measurement performed in eDRX mode, the requirement being either specific to joint MDT and eDRX operation or different from a corresponding requirement in non-eDRX mode; where some example requirements are a set of measurements, a number of measurements over a time unit, a number of cells to measure, measurement time, measurement accuracy, measurement conditions, etc.

This UE capability may be used at least in Step 100 and/or Step 106. However, it is also possible that a UE with such capability performs differently at least one of the other steps, compared to UEs without such capability.

Step 100

According to this step, a UE may indicate to another node (e.g., network node or another UE) implicitly or explicitly its capability to jointly support eDRX and MDT. The indication may be sent upon a request from the other node or in an unsolicited way, upon a triggering event or condition, etc.

An example explicit indication may be included in a capability message sent by the UE.

An example implicit indication may be comprised in the UE's type information or another capability of the UE, e.g., any eMTC are capable of supporting eDRX and MDT jointly.

Step 102

According to this step, the UE obtains at least one of eDRX configuration (say, DRX1) and MDT configuration parameter. The eDRX configuration may comprise one or more eDRX parameter configuration, and the MDT configuration may comprise one or more MDT parameter configuration.

Some example eDRX configuration parameters and MDT configuration parameters are in given above, e.g., in the Background section.

In one further embodiment, at least one of the eDRX or MDT configuration parameter may be specific for joint using MDT and eDRX.

DRX1 configuration may or may not comprise PTW configuration and the UE may or may not use one or more DRX levels (e.g., DRX1 and DRX2 such as eDRX and DRX in RRC_IDLE).

The obtaining may comprise any one or more of:
Receiving from another UE (e.g., via broadcast, multicast, or unicast)
Receiving from a network node (e.g., via broadcast, multicast, or unicast)
Determining based on a pre-defined rule (e.g., applying a certain function to derive a parameter when in eDRX based on a parameter for DRX, such as scaling and/or adding a delta)
Autonomously determining
Using a pre-defined or default configuration
Determining based on the history (using the last used configuration or most frequently used)

Step 104

According to this step, based on the obtained configuration, the UE may adapt at least one of:
UE activity state, e.g., UE wakes up/becomes active more frequently to complete at least one MDT measurement within e.g. one PTW or within N DRX1 cycles where N may be equal e.g. to 1 or within a pre-defined time,
At least one DRX2 configuration parameter, e.g., reducing DRX2 cycle length, increasing the ON time, increasing the total activity time while using DRX2,
MDT measurement procedure, e.g., increasing sampling rate or sampling frequency, extending the total MDT measurement time, adapt the MDT measurement time to the DRX1 configuration or determine the MDT measurement time based on the DRX1 configuration (e.g., to relate to the number of DRX1 cycles where eDRX cycle length >2.56 seconds),
MDT logging procedure, e.g., increasing logging rate or logging frequency for eDRX compared to when the UE is in non-eDRX, determining the logging duration and/or logging interval to adopt to DRX1 configuration, adapt the contents of logs e.g. log a different set of measurements in eDRX compared to non-eDRX mode or do not log some measurement types when in eDRX mode,
at least one MDT configuration parameter, e.g., increase measurement reporting time and/or periodicity, using a different set of measurements to be performed for MDT in eDRX compared to non-eDRX (e.g., some measurements such as MCH BLER may be not performed in eDRX),
at least one eDRX configuration parameter, reducing the DRX1 cycle length, increasing PTW size, increasing the ON time, increasing the total activity time while using DRX1,
at least one of the clocks used for MDT measurements, e.g., adapt the clock rate to ensure more accurate time stamps when in eDRX, using a separate time clock for MDT when in eDRX, using a time clock configuration for MDT in eDRX to meet a certain performance level (e.g., the relative time stamp accuracy for MDT measurements in eDRX is such that the drift of the time stamping shall be not more than ±X seconds per Y hours which is more accurate than using the clock with the existing requirement of ±2 seconds per hour),
location obtaining procedure, e.g., obtain the UE location information and/or UE positioning measurements adaptively to eDRX and in association with the MDT measurement performed in eDRX in order to accomplish the MDT measurements performed in eDRX with location information and/or ensure a certain location performance level in eDRX,
at least one of the timers used for MDT measurements, e.g., increase a timer value to ensure a certain performance level when in eDRX.

One example of ensuring some of the UE behaviors described above is to ensure this by a requirement that the UE shall complete an MDT measurement within at most some predefined time such as:
When the UE is using eDRX_IDLE cycle, the MBSFN RSRP measurement period is defined as MAX (one eDRX_IDLE cycle, period during which the UE decodes 5 subframes containing PMCH transmissions).
When the UE is using eDRX_IDLE cycle, the MBSFN RSRQ measurement period is defined as MAX (one eDRX_IDLE cycle, the period during which the UE decodes 5 subframes containing PMCH transmissions).
The MCH BLER measurement period is equal to MAX (one eDRX_IDLE cycle, MBSFN logging interval configured by higher layers).

In another example, the UE may decide to not perform MDT and be in eDRX at the same time, e.g., MDT measurements or applying the eDRX configuration may be delayed, dropped, postponed, cancelled, ignored if the joint configuration is received from the network, etc., or the UE may perform a fallback to a configuration without joint eDRX and MDT when it's configured for this. In yet another example, the UE may decide to not perform MDT and be in eDRX at the same time if it does not support joint MDT and eDRX.

The adaption may also be performed under a certain condition, e.g., any one or more of:
DRX1 cycle>threshold,
DRX2 cycle>threshold,
PTW<threshold,
PTW comprises M DRX2 cycles where M<threshold,
K DRX2 cycles>threshold where K is the number of DRX2 cycles used for the measurement in a non-eDRX mode,
L DRX1 cycles>threshold where L is the number of DRX cycles used for the measurement in a non-eDRX mode,
Signal quality is below a threshold or interference level is above a threshold.

Step 106

According to this step, the UE is performing an MDT measurement, based on at least one of the adaption above and the UE's capability to jointly support eDRX and MDT.

The UE may also be required to meet one or more requirements for the performed MDT measurement, e.g., measurement time, measurement accuracy, number of measurements, number of signals or cells to measure, etc.

Step 108

According to this step, the UE may log and/or report to another node (another UE or network node) the performed MDT measurement.

The UE may also indicate for at least one MDT measurement in the log and/or report that the UE was in eDRX while doing one or more of: receiving MDT measurement configuration or request, performing the MDT measurement, logging the MDT measurement, and reporting the MDT measurement.

Figure 8:
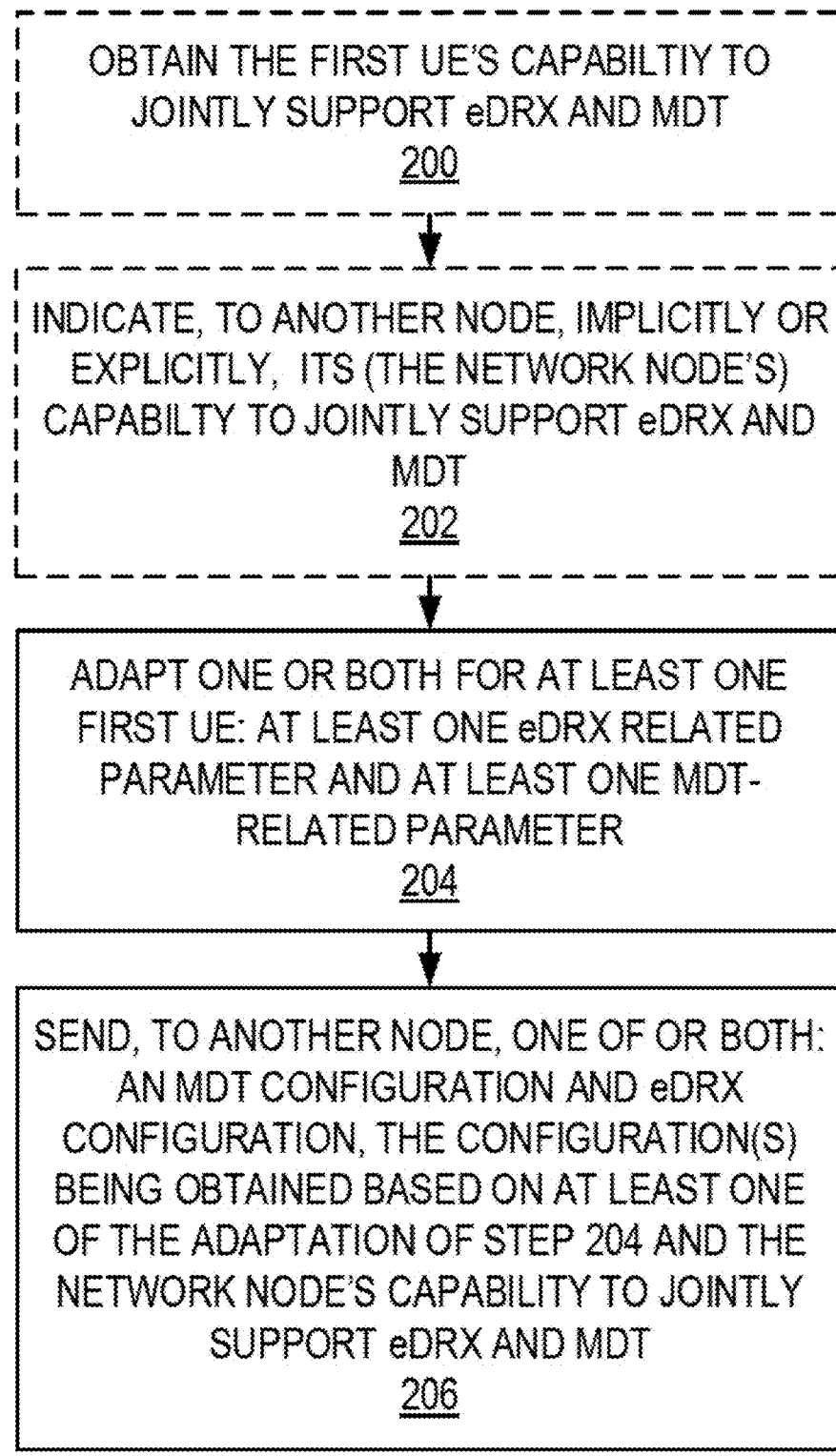
FIG. 8 is a flow chart illustrating the operation of a network node according to some embodiments of the disclosed subject matter.

FIG. 8 illustrates a method in a network node according to an embodiment of the disclosed subject matter.

Referring to FIG. 8, the method comprises the following:
Step 200 (optional): Obtaining a first UE's capability to jointly support eDRX and MDT
Step 202 (optional): Indicating to another node (e.g., UE or another network node) implicitly or explicitly its (the network node's) capability to jointly support eDRX and MDT
Step 204: Adapting one of or both for at least one first UE: at least one eDRX-related parameter and at least one MDT-related parameter, based on one or more of: UE's capability to jointly support eDRX and MDT, network node's capability to jointly support eDRX and MDT, eDRX configuration, and MDT configuration.
Step 206: Sending to another node (e.g., at least one UE or another network node) one of or both: an MDT configuration and eDRX configuration to another node, the configuration(s) being obtained based on at least one of the adaption above and the network node's capability to jointly support eDRX and MDT.

UE's Capability to Jointly Support eDRX and MDT

The UEs capability to jointly support eDRX and MDT may be as described in the section above entitled "UE's capability to jointly support eDRX and MDT."

The UE's capability may be obtained by the network node in different ways, e.g.:
Receiving from another network node an implicit or explicit indication about the capability or receiving the forwarded capability information (e.g., originally received from the first UE),
Receiving from another UE an implicit or explicit indication about the capability of the first UE or receiving the forwarded capability information (e.g., originally received from the first UE),
Determining based on a pre-defined rule,
Determining based on the history information,
Determining based on the first UE measurements or measurement reporting or measurement report contents,
Determining based on observing the first UE behavior (e.g., the UE supporting jointly MDT and eDRX may be reporting over a different time interval than UE without such capability, observing UE activity, observing UE transmissions).

Network Node's Capability to Jointly Support eDRX and MDT

It may be so that some, but not all, network nodes supporting eDRX and MDT are also capable of jointly supporting eDRX and MDT. Such capability may comprise any one or more of:
Ability to adapt at least one eDRX and/or MDT parameter when both are jointly configured for one or more UEs compared to network nodes not supporting such capability,
Ability to configure jointly for eDRX and MDT at least one UE in a way different from when such capability is not supported,
Ability to receive signaling specific for the joint MDT and eDRX (e.g. at least one MDT parameter applicable in UE eDRX mode and/or at least one eDRX parameter applicable for MDT) from another node (e.g., a network node or another UE),
Ability to send signaling specific for the joint MDT and eDRX (e.g. at least one MDT parameter applicable in UE eDRX mode and/or at least one eDRX parameter applicable for MDT) to another node (e.g., a network node or another UE),
Ability to indicate to another node (e.g., another network node or UE) that the network node is capable of jointly supporting eDRX and MDT,
Ability to receive and extract the information for UE logs specific to the joint eDRX and MDT, The network node may also indicate to another node (e.g., UE or another network node) implicitly or explicitly its capability to jointly support eDRX and MDT.

Step 204

According to this step, the network node may adapt one of or both for at least one first UE: at least one eDRX-related parameter and at least one MDT-related parameter, based on one or more of:
UE's capability to jointly support eDRX and MDT, e.g., the network node may decide to
not configure eDRX and MDT for UEs without such capability,
configure non-eDRX and MDT or no MDT during eDRX,
allow for a certain performance degradation for UE without such capability,
network node's capability to jointly support eDRX and MDT for at least one UE, e.g., network nodes with such capability may support a specific signaling for joint eDRX and MDT,
eDRX configuration, e.g., adapt at least one MDT configuration parameter to the eDRX configuration,
MDT configuration, e.g., adapt at least one eDRX configuration parameter to the MDT configuration.

Some further examples of the adaptation, e.g., the network node adapts
at least one eDRX configuration parameter, e.g., reducing the DRX1 cycle length, increasing PTW size, increasing the UE ON time, increasing the total activity time for UE using DRX1,
at least one DRX2 configuration parameter (if the UE is configured with DRX1 and DRX2, where DRX1 cycle is longer than DRX2 cycle), e.g., reducing DRX2 cycle length, increasing the ON time, increasing the total activity time while using DRX2,
at least one MDT configuration parameter, e.g., increase measurement time, increase measurement reporting time and/or periodicity, configuring a different set of measurements to be performed for MDT in eDRX compared to non-eDRX (e.g., some measurements such as MCH BIER may be not performed in eDRX), adapt the MDT log configuration e.g., increasing logging rate or logging frequency for eDRX compared to when the UE is in non-eDRX, determining the logging duration and/or logging interval to adopt to DRX1 configuration, adapt the contents of logs e.g. log a different set of measurements in eDRX compared to non-eDRX mode or do not log some measurement types when in eDRX mode,
a combination of PTW length and the DRX2 cycle length to ensure a required number of legacy DRX cycles within a PTW; the network may also avoid configuring certain (PTW; DRX cycle length) combinations when the number of DRX2 cycles within a PTW is insufficient, UE positioning procedure, e.g., configure UE and/or network positioning measurements or obtain the UE location information and/or UE positioning measurements adaptively to eDRX and in association with the MDT measurement performed in eDRX, to efficiently use UE power and/or associate UE MDT measurements with the location during these measurements for UE in eDRX, at least one of the timers used for MDT measurements, e.g., to allow for a longer MDT measurement time in eDRX.

In another example, the UE may decide to not perform MDT and be in eDRX at the same time, e.g., MDT measurements or applying the eDRX configuration may be delayed, dropped, postponed, cancelled, ignored if the joint configuration is received from the network, etc., or the UE may perform a fallback to a configuration without joint eDRX and MDT when it's configured for this. In yet another example, the UE may decide to not perform MDT and be in eDRX at the same time if it does not support joint MDT and eDRX.

The adaption may also be performed under a certain condition, e.g., any one or more of:

DRX1 cycle>threshold,
DRX2 cycle>threshold,
PTW<threshold,
PTW comprises M DRX2 cycles where M<threshold,
K DRX2 cycles>threshold where K is the number of DRX2 cycles used for the measurement in a non-eDRX mode,
L DRX1 cycles>threshold where L is the number of DRX cycles used for the measurement in a non-eDRX mode,
Signal quality is below a threshold or interference level is above a threshold.

Step 206

According to this step, the network node may send to another node (e.g., at least one UE or another network node) one of or both: an MDT configuration and eDRX configuration to another node, the configuration(s) being obtained based on at least one of the adaption above and the network node's capability to jointly support eDRX and MDT.

Certain embodiments of the disclosed subject matter relate to joint eDRX and MDT operation. As described above, to allow for joint eDRX and MDT operation, the UE or the network node adapts the MDT-related parameter configuration and/or eDRX-related parameter. Some UEs may also indicate to another node its capability to jointly support eDRX and MDT.

Figure 9:
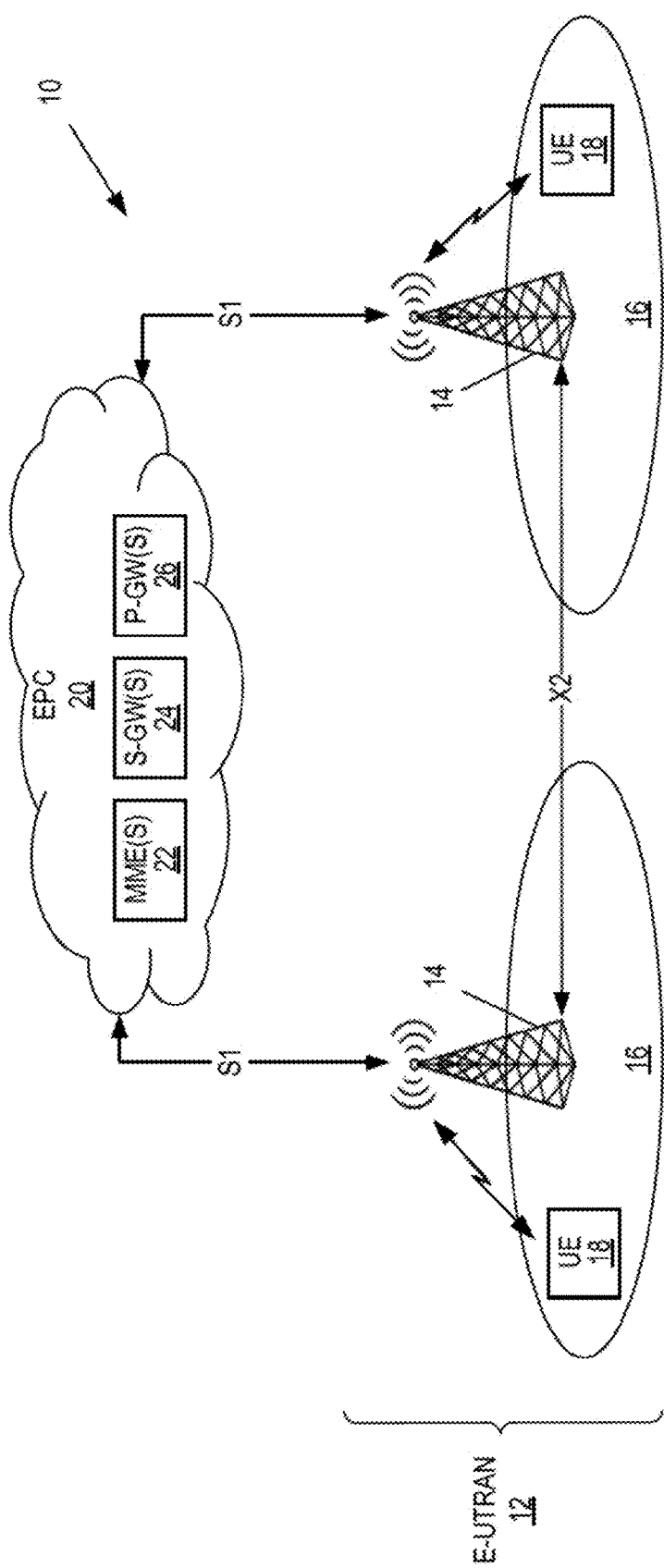
FIG. 9 is an example cellular communications system in which embodiments of the disclosed subject matter may be implemented.

Certain embodiments of the disclosed subject matter are implemented in a cellular communications system. One example of a cellular communications system 10 in which embodiments of the disclosed subject matter may be implemented is illustrated in FIG. 9. As illustrated, the example cellular communications system 10 includes an Evolved or Enhanced Universal Terrestrial Radio Access Network (E-UTRAN) 12, or more generally a radio access network, that includes a number of radio access nodes, or radio network nodes, including base stations (e.g., eNBs) 14 serving corresponding cells 16. UEs 18 within the coverage areas of the cells 16 are provided cellular service via the respective base stations 14. The cellular communications system 10 also includes an Evolved Packet Core (EPC) 20, or more generally a core network. The EPC 20 includes various core network nodes such as, for example, one or more MMEs 22, one or more Serving Gateways (S-GWs) 24, and one or more Packet Date Network (PDN) Gateways (P-GWs) 26.

Figure 10:
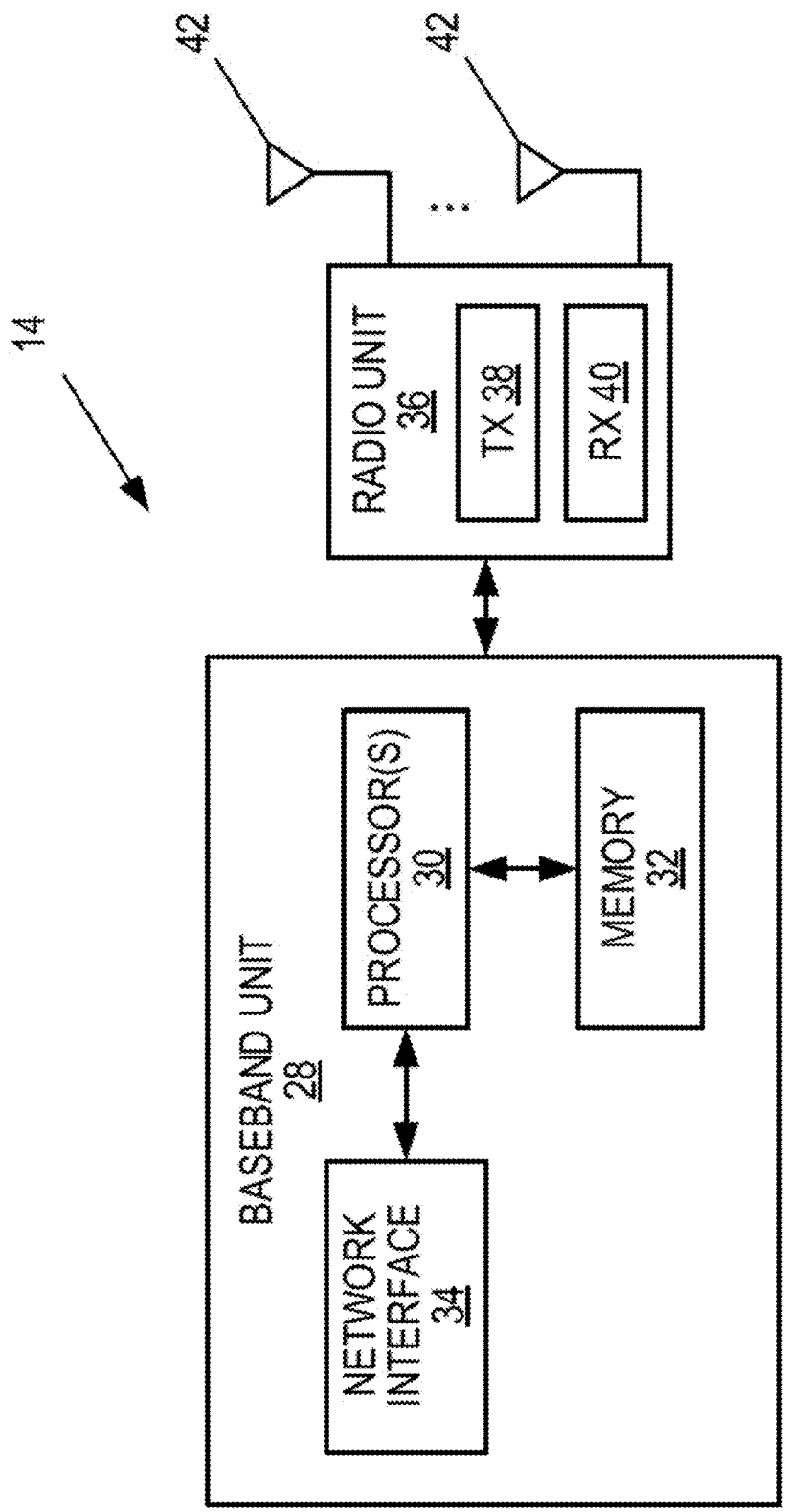
FIG. 10 is a diagram of a base station according to an embodiment of the disclosed subject matter; an FIG. 11 is a diagram of a base station according to an embodiment of the disclosed subject matter.

FIG. 10 illustrates one example of base station 14 according to some embodiments of the disclosed subject matter. As illustrated, base station 14 includes a baseband unit 28 including one or more processors 30 (e.g., one or more Central Processing Units (CPUs), one or more Application Specific Integrated Circuits (ASICs), one or more Field Programmable Gate Arrays (FPGAs), or the like, or any combination thereof), memory 32, and a network interface 34 connected to a radio unit(s) 36 including transmitter(s) 38 and receiver(s) 40 connected to one or more antennas 42. In some embodiments, the functionality of the network node described herein is implemented in base station 14 as software that is stored in, e.g., the memory 32 and executed by the processor(s) 30.

Note that base station 14 is only one example of a network node in which embodiments of the disclosed subject matter may be implemented. Other types of network nodes may have architectures similar to or different than that of base station 14 illustrated in FIG. 10. For example, some network nodes (e.g., core network nodes) may include the processor(s) 30, memory 32, and network interface 34, but not the radio unit 36.

Figure 11:
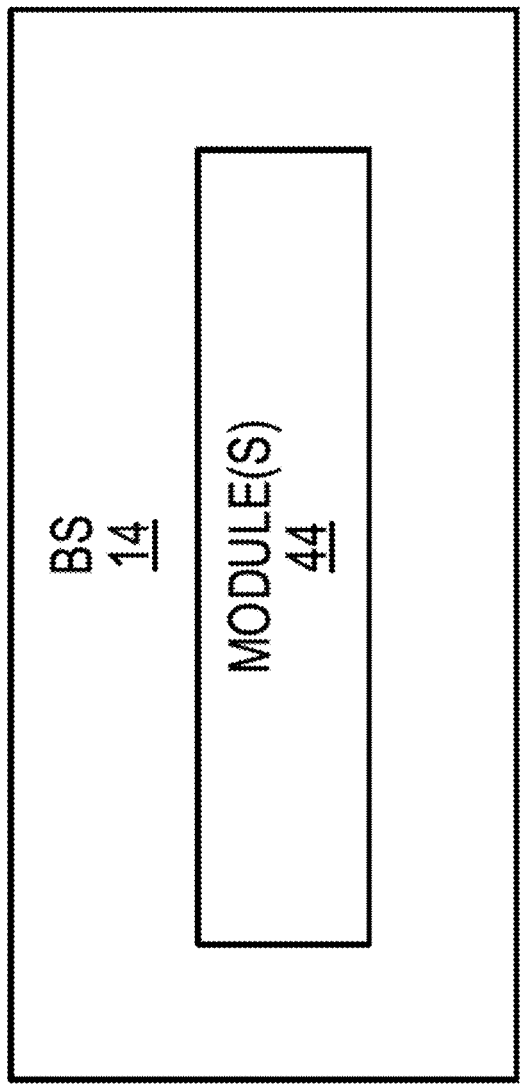

FIG. 11 illustrates another example embodiment of base station 14. In this embodiment, base station 14 includes one or modules 44, each of which is implemented in software. The module(s) 44 operate to provide the functionality of the network node according to any of the embodiments described herein. In a similar manner, in some embodiments, other types of network nodes may include module(s) 44 that implement the functionality of the network node described herein.

In some embodiments, a computer program including instructions which, when executed by at least one processor, causes the at least one processor to carry out the functionality of the network node according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 32).

Figure 12:
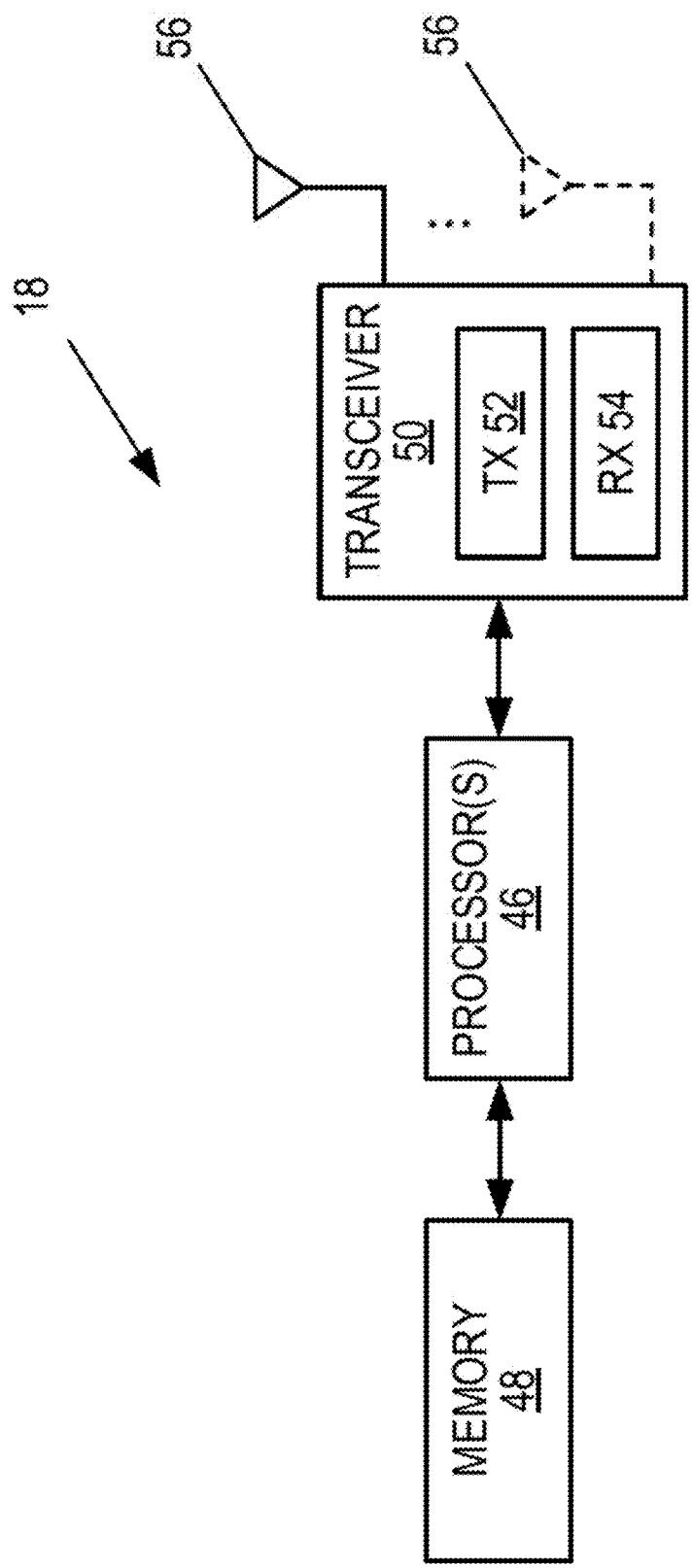
FIG. 12 is a block diagram of a wireless device according to an embodiment of the disclosed subject matter.

FIG. 12 illustrates one example implementation of UE 18, or more generally a wireless device, according to some embodiments of the disclosed subject matter. As illustrated, UE 18 includes one or more processors 46 (e.g., one or more CPUs, one or more ASICs, one or more FPGAs, or the like, or any combination thereof), memory 48, and a transceiver(s) 50 including transmitter(s) 52 and receiver(s) 54 connected to one or more antennas 56. In some embodiments, the functionality of the UE described herein is implemented in UE 18 as software that is stored in, e.g., the memory 48 and executed by the processor(s) 46.

FIG. 13 illustrates another example embodiment of UE 18. In this embodiment, UE 18 includes one or modules 58, each of which is implemented in software. The module(s) 58 operate to provide the functionality of UE 18 according to any of the embodiments described herein.

In some embodiments, a computer program includes instructions which, when executed by at least one processor, causes the at least one processor to carry out the functionality of the UE according to any of the embodiments described herein. In some embodiments, a carrier containing the aforementioned computer program product is provided. The carrier is one of an electronic signal, an optical signal, a radio signal, or a computer readable storage medium (e.g., a non-transitory computer readable medium such as the memory 48).

Those skilled in the art will recognize improvements and modifications to the embodiments of the disclosed subject matter. All such improvements and modifications are considered within the scope of the concepts disclosed herein.

The invention claimed is:

1. A method in a wireless device, comprising:
   obtaining an extended discontinuous reception (eDRX) configuration for the wireless device;
   obtaining a minimization of drive tests (MDT) configuration for the wireless device;
   adapting at least one of the eDRX configuration and the MDT configuration such that the wireless device completes an MDT measurement according to the MDT configuration within a predetermined number of paging transmission windows (PTWs) associated with the eDRX configuration
   performing the MDT measurement within the predetermined number of PTWs according to the adapted at least one of the eDRX configuration and the MDT configuration,
   wherein adapting the at least one of the eDRX configuration and the MDT configuration comprises changing a size of the PTW or changing a DRX cycle length.

2. The method of claim 1, wherein the predetermined number of PTWs is one.

3. The method of claim 1, further comprising determining the number of PTWs, at least based on a measurement type of the MDT measurement and the eDRX configuration.

4. The method of claim 1, wherein the MDT measurement is an E-UTRA reference signal received power (RSRP) measurement or an E-UTRA reference signal received quality (RSRQ) measurement.

5. The method of claim 1, wherein the MDT measurement is a Multicast-broadcast single-frequency network (MBSFN) measurement.

6. The method of claim 1 further comprising logging the measurement within the predetermined number of PTWs.

7. The method of claim 1, further comprising logging the MDT measurement within the predetermined number of PTWs according to the adapted at least one of the eDRX configuration and the MDT configuration.

8. The method of claim 1, further comprising indicating to another node the wireless device's capability to jointly support eDRX and MDT.

9. A method in a network node, comprising:
   adapting at least one of an extended discontinuous reception (eDRX) configuration and a minimization of drive tests (MDT) configuration for a wireless device such that the wireless device can complete an MDT measurement according to the MDT configuration within a predetermined number of paging transmission windows (PTWs) associated with the eDRX configuration; and
   transmitting, to another node, the adapted at least one of the MDT configuration and the eDRX configuration;
   wherein adapting the at least one of the eDRX configuration and the MDT configuration comprises changing a size of the PTW or changing a DRX cycle length.

10. The method of claim 9, wherein the predetermined number of PTWs is one.

11. The method of claim 9, further comprising determining the number of PTWs, at least based on a measurement type of the MDT measurement and the eDRX configuration.

12. The method of claim 9, wherein the MDT measurement is E-UTRA reference signal received power (RSRP) or E-UTRA reference signal received quality (RSRQ) measurement.

13. The method of claim 9, wherein the MDT measurement is a Multicast-broadcast single-frequency network (MBSFN) measurement.

14. The method of claim 9 further comprising logging the measurement within the predetermined number of PTWs.

15. The method of claim 9, further comprising obtaining an indication of the wireless device's capability to jointly support eDRX and MDT.

16. The method of claim 9, further comprising indicating to another node the network node's capability to jointly support eDRX and MDT.

17. A wireless device, comprising:
   at least one processor and memory collectively configured to:
   obtain an extended discontinuous reception (eDRX) configuration for the wireless device;
   obtain a minimization of drive tests (MDT) configuration for the wireless device;
   adapt at least one of the eDRX configuration and the MDT configuration such that the wireless device completes an MDT measurement according to the MDT configuration within a predetermined number of paging transmission windows (PTWs) associated with the eDRX configuration; and
   perform the MDT measurement within the predetermined number of PTWs according to the adapted at least one of the eDRX configuration and the MDT configuration;
   wherein adapting the at least one of the eDRX configuration and the MDT configuration comprises changing a size of the PTW or changing a DRX cycle length.

18. The wireless device of claim 17, wherein the predetermined number of PTWs is one.

19. The wireless device of claim 17, wherein the at least one processor is further configured to determine the number of PTWs, at least based on a measurement type of the MDT measurement and the eDRX configuration.

20. The wireless device of claim 17, wherein the MDT measurement is an E-UTRA reference signal received power (RSRP) measurement or an E-UTRA reference signal received quality (RSRQ) measurement.

21. The wireless device of claim 17, wherein the MDT measurement is a Multicast-broadcast single-frequency network (MBSFN) measurement.

22. The wireless device of claim 17, wherein the at least one processor is further configured to log the measurement within the predetermined number of PTWs.

23. The wireless device of claim 17, wherein the at least one processor is further configured to log the MDT measurement within the predetermined number of PTWs according to the adapted at least one of the eDRX configuration and the MDT configuration.

24. The wireless device of claim 17, further comprising a transmitter configured to transmit information indicating to another node the wireless device's capability to jointly support eDRX and MDT.

25. A network node, comprising:
   at least one processor and memory collectively configured to:
   adapt at least one of an extended discontinuous reception (eDRX) configuration and a minimization of drive tests (MDT) configuration for a wireless device such that the wireless device can complete an MDT measurement according to the MDT configuration within a predetermined number of paging transmission windows (PTWs) associated with the eDRX configuration; and a transmitter configured to transmit, to another node, the adapted at least one of the MDT configuration and the eDRX configuration;

wherein adapting the at least one of the eDRX configuration and the MDT configuration comprises changing a size of the PTW or changing a DRX cycle length.

26. The network node of claim 25, wherein the predetermined number of PTWs is one.

27. The network node of claim 25, wherein the at least one processor is further configured to determine the number of PTWs, at least based on a measurement type of the MDT measurement and the eDRX configuration.

28. The network node of claim 25, wherein the MDT measurement is E-UTRA reference signal received power (RSRP) or E-UTRA reference signal received quality (RSRQ) measurement.

29. The network node of claim 25, wherein the MDT measurement is a Multicast-broadcast single-frequency network (MBSFN) measurement.

30. The network node of claim 25, wherein the at least one processor is further configured to log the measurement within the predetermined number of PTWs.

31. The network node of claim 25, wherein the at least one processor is further configured to obtain an indication of the wireless device's capability to jointly support eDRX and MDT.

32. The network node of claim 25, wherein the transmitter is further configured to transmit information indicating to another node the network node's capability to jointly support eDRX and MDT.

33. A wireless device, comprising:
a first obtaining module configured to obtain an extended discontinuous reception (eDRX) configuration for the wireless device;
a second obtaining module configured to obtain a minimization of drive tests (MDT) configuration for the wireless device;
an adapting module configured to adapt at least one of the eDRX configuration and the MDT configuration such that the wireless device completes an MDT measurement according to the MDT configuration within a predetermined number of paging transmission windows (PTWs) associated with the eDRX configuration; and
a measurement module configured to perform the MDT measurement within the predetermined number of PTWs according to the adapted at least one of the eDRX configuration and the MDT configuration;
wherein adapting the at least one of the eDRX configuration and the MDT configuration comprises changing a size of the PTW or changing a DRX cycle length.

34. The wireless device of claim 33, wherein the predetermined number of PTWs is one.

35. The wireless device of claim 33, further comprising a determining module configured to determine the number of PTWs, at least based on a measurement type of the MDT measurement and the eDRX configuration.

36. The wireless device of claim 33, wherein the MDT measurement is an E-UTRA reference signal received power (RSRP) measurement or an E-UTRA reference signal received quality (RSRQ) measurement.

37. The wireless device of claim 33, wherein the MDT measurement is a Multicast-broadcast single-frequency network (MBSFN) measurement.

38. The wireless device of claim 33, further comprising a logging module configured to log the measurement within the predetermined number of PTWs.

39. The wireless device of claim 33, wherein the at least one processor is further configured to log the MDT measurement within the predetermined number of PTWs according to the adapted at least one of the eDRX configuration and the MDT configuration.

40. The wireless device of claim 33, further comprising a transmission module configured to transmit information indicating to another node the wireless device's capability to jointly support eDRX and MDT.

41. A network node, comprising:
an adapting module configured to adapt at least one of an extended discontinuous reception (eDRX) configuration and a minimization of drive tests (MDT) configuration for a wireless device such that the wireless device can complete an MDT measurement according to the MDT configuration within a predetermined number of paging transmission windows (PTWs) associated with the eDRX configuration; and
a transmission module configured to transmit, to another node, the adapted at least one of the MDT configuration and the eDRX configuration;
wherein adapting the at least one of the eDRX configuration and the MDT configuration comprises changing a size of the PTW or changing a DRX cycle length.

42. The network node of claim 41, wherein the predetermined number of PTWs is one.

43. The network node of claim 41, further comprising a determining module configured to determine the number of PTWs, at least based on a measurement type of the MDT measurement and the eDRX configuration.

44. The network node of claim 41, wherein the MDT measurement is E-UTRA reference signal received power (RSRP) or E-UTRA reference signal received quality (RSRQ) measurement.

45. The network node of claim 41, wherein the MDT measurement is a Multicast-broadcast single-frequency network (MBSFN) measurement.

46. The network node of claim 41, further comprising a logging module configured to log the measurement within the predetermined number of PTWs.

47. The network node of claim 41, further comprising an obtaining module configured to obtain an indication of the wireless device's capability to jointly support eDRX and MDT.

48. The network node of claim 41, wherein the transmission module is further configured to transmit information indicating to another node the network node's capability to jointly support eDRX and MDT.

* * * * *